US006826207B2

United States Patent
Xu et al.

(10) Patent No.: US 6,826,207 B2
(45) Date of Patent: Nov. 30, 2004

(54) MULTI-WAVELENGTH LASER SOURCE BASED ON TWO OPTICAL LASER BEAT SIGNAL AND METHOD

(75) Inventors: Jidong Xu, Gloucester (CA); Qi Yang Peng, Ottawa (CA); Hanwu Hu, Ottawa (CA); Nima Ahmadvand, Ottawa (CA)

(73) Assignee: Peleton Photonic Systems Inc. (CA)

( * ) Notice: Subject to any disclaimer, the term of this patent is extended or adjusted under 35 U.S.C. 154(b) by 0 days.

(21) Appl. No.: 10/015,753

(22) Filed: Dec. 17, 2001

(65) Prior Publication Data

US 2003/0112839 A1 Jun. 19, 2003

(51) Int. Cl.[7] ............................................... H01S 3/10
(52) U.S. Cl. ........................................ 372/21; 372/22
(58) Field of Search .............................. 372/21, 6, 22, 372/26; 359/730

(56) References Cited

U.S. PATENT DOCUMENTS

| 5,028,889 | A |   | 7/1991  | Fedan ......................... 331/183 |
| 5,256,968 | A |   | 10/1993 | Loualiche et al. |
| 5,434,701 | A |   | 7/1995  | Fatehi et al. ................. 359/341 |
| 5,537,243 | A |   | 7/1996  | Fatehi et al. ................. 359/541 |
| 5,564,832 | A |   | 10/1996 | Ball et al. |
| 5,796,891 | A | * | 8/1998  | Poustie et al. ................. 385/28 |
| 5,841,571 | A |   | 11/1998 | Terahara ....................... 359/341 |
| 5,930,024 | A |   | 7/1999  | Atlas |
| 5,963,567 | A | * | 10/1999 | Veselka et al. ................ 372/21 |
| 6,104,848 | A |   | 8/2000  | Toyohara et al. ............. 385/24 |
| 6,111,688 | A |   | 8/2000  | Kobayashi et al. .......... 359/341 |
| 6,160,657 | A |   | 12/2000 | Lee et al. ..................... 359/334 |
| 6,163,553 | A |   | 12/2000 | Pfeiffer .......................... 372/6 |
| 6,282,214 | B1 |  | 8/2001  | Goto et al. |
| 6,298,187 | B1 | * | 10/2001 | Waarts et al. ................. 385/37 |
| 6,323,991 | B2 |  | 11/2001 | Cisternino et al. .......... 359/329 |
| 6,341,025 | B1 | * | 1/2002  | Mizrahi et al. .............. 359/130 |
| 6,341,034 | B1 |  | 1/2002  | Sun et al. .................. 359/341.41 |
| 6,417,965 | B1 |  | 7/2002  | Ye et al. .................. 359/341.41 |
| 6,433,306 | B1 | * | 8/2002  | Grubb et al. ............... 219/121.73 |
| 2002/0054613 | A1 | * | 5/2002 | Kang ............................. 372/6 |
| 2002/0176153 | A1 | * | 11/2002 | Matsushita et al. ......... 359/333 |
| 2003/0012492 | A1 | * | 1/2003  | Tadakuma et al. ............ 385/27 |

FOREIGN PATENT DOCUMENTS

EP          0 899 887 A2    3/1999

* cited by examiner

*Primary Examiner*—Don Wong
*Assistant Examiner*—Hung Tran Vy
(74) *Attorney, Agent, or Firm*—Katten Muchin Zavis Rosenman

(57) ABSTRACT

In the system of the present invention, two DFB laser outputs are combined in a first stage to produce a beat signal. The two main channels interfere with each other to form beat signals. This combined signal is then used as the seed to create multi-channels through optical fiber non-linearity in a multiplier stage.

11 Claims, 2 Drawing Sheets

MULTI-WAVELENGTH LASER SOURCE BASED ON TWO OPTICAL LASER BEAT SIGNAL AND METHOD

BACKGROUND OF THE INVENTION

1. Field of the Invention

This invention relates generally to optical communication systems and particularly to optical laser sources with multiple lasing wavelengths. More particularly still, it provides multi-channel laser signals by utilizing the beat signal of two lasers followed by a non-linear fiber multiplier.

2. Prior Art of the Invention

Dense wavelength division multiplexing (DWDM) offers a very efficient method to exploit the available bandwidth in the low attenuation band of the optical fiber. In this technology, the enormous available bandwidth is chopped into a number of parallel wavelength channels, where each channel carries data up to a maximum rate compatible with electronic interfaces. Furthermore, different protocols and framing may be used on different channels. This is very similar to frequency division multiplexing (FDM) used for radio and TV transmissions. As technology progresses the number of feasible channels in the total band increases. Early WDM systems used only 4 to 16 channels, while new systems are targeting more than 100 channels.

The low attenuation wavelength band includes different wavelength sub-bands. The first band used in modem optical communications is called Conventional Band or C-Band. This band includes wavelength channels from 1520 to 1565 nm. As demand for more bandwidth increased, the number of channels in the C-Band could not provide the capacity required by modem telecommunication networks. Therefore, longer and shorter wavelength channels were introduced. Wavelengths covering 1565 to 1610 nm form the Long Band or L-Band, while 1475 to 1520 nm form the Short Band or S-Band.

In the transmitter side of a WDM system, there are a number of different laser sources with different wavelengths. Each data channel is modulated on one of the wavelength channels and all the wavelength channels are then multiplexed and transmitted via the same optical fiber. At the receiving end, each channel must be demultiplexed from the set of wavelength channels. An optical receiver, then, will demodulate data from each channel. The capacity of a WDM system increases as more wavelength channels are provided. It is therefore desirable to increase the number of channels, decrease channel spacing and increase the total wavelength window.

Present DWDM systems need a large number of laser sources as well as techniques to modulate data signals on each source, combine, demultiplex and detect each data stream. The present invention addresses the important requirement for laser sources. In particular, it provides a multi-wavelength laser source that simultaneously furnishes a number of wavelength channels.

Currently, laser sources used in DWDM systems are exclusively of the single-wavelength variety. Distributed Feed-Back (DFB) lasers, Fabry-Perot lasers and ring lasers are some of the main technologies. Each wavelength supported in the system has a dedicated laser and its ancillary electronics. In the last few years and still today, the majority of lasers used are capable of emitting light only at a fixed wavelength. Increasingly, however, designs are making use of tunable wavelength lasers, which have broader spectral range and can operate at any point within that range. The primary drawback of both of these devices, however, is the sheer number that is required to satisfy high channel count systems proposed for the future optical network. At the same time, it is important to be able to lock the center wavelength of each laser source to a specific wavelength. This is mainly due to the fact that if there is any drift in the wavelength of a laser, it can interfere with the adjacent wavelength channel. This fact imposes a practical limitation on the number of discrete laser sources that may be placed in a very tightly spaced wavelength channel system providing a large number of channels. As a result, a multi-wavelength laser source that can provide an efficient and simple wavelength locking system is highly desirable.

SUMMARY OF THE INVENTION

This invention provides a novel design which provides simultaneously a number of wavelength channels. The present design requires only a single wavelength locking mechanism to tune and lock the entire set of channels to the ITU standard grid. Furthermore, the present system is able to provide wavelength channels in all three S, C and L bands.

In the system of the present invention, two DFB laser outputs are combined in a first stage to produce a beat signal. The two main channels interfere with each other to form beat signals. This combined signal is then used as the seed to create multi-channels through optical fiber non-linearity in a multiplier stage. The multiplier stage expands the two initial channels to cover the target wavelength band. A Comblike Dispersion Profile Fiber (CDPF) system is used in the multiplier section. The channel spacing of the resulting channel set follows the channel spacing of the two initial DFB lasers.

Accordingly, a multi-wavelength laser source (MWLS) system, comprising first and second monochromatic lasers having first ($f_1$) and second ($f_2$) lasing frequencies, respectively, means for amplifying combined signals of said first and second lasers and means for multiplexing the amplified combined signals to yield Comblike multi-channel laser signals separated from each other by a frequency equal to the difference between $f_1$ and $f_2$.

The system as defined above, said means for multiplying comprising a plurality of serially interconnected optical fiber sections each having predetermined propagation characteristics for said amplified combined signals, said predetermined propagation characteristics being propagation mode, dispersion and length.

BRIEF DESCRIPTION OF THE DRAWINGS

The preferred exemplary embodiments of the present invention will now be described in detail in conjunction with the annexed drawing, in which.

DETAILED DESCRIPTION OF THE PREFERRED EMBODIMENTS

Figure 1:
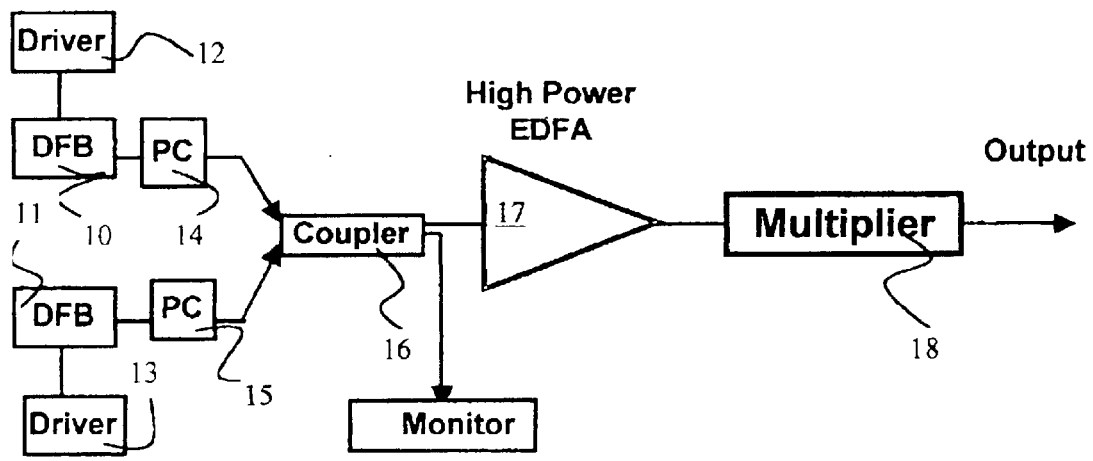
FIG. 1 shows a block diagram of a Multi-Wavelength Laser Source (MWLS) according to the present invention.

Referring now to FIG. 1, a Multi-Wavelength Laser Source (MWLS) system based on two DFB laser beat signal is shown. The system starts with two single channel DFB laser sources 10 and 11 and multiplies the number of channels to cover a target wavelength band such as C, L, S or a combination of thereof. The ultimate channel spacing between adjacent channels is dictated by the spacing of the two original lasers 10 and 11. Consequently, a very good locking technique on the original lasers insures wavelength locking in the whole set of output channels. Tuning of the whole set of channels to the ITU grid is also based on the tuning of the two starting lasers. This means that the driver circuits 10 and 11 for the original seed lasers 10 and 11 need to tune and wavelength-lock the two lasers to the ITU grid. As a result, this MWLS design simplifies the wavelength tuning and locking which otherwise would have had to be performed for each individual laser. Thus, in the case of a few hundred channels, it is easy to see the benefits of the central tuning and locking of only two lasers.

The output signals of the DFB lasers 10 and 11 are combined in a first stage coupler 16 after passing through polarization controllers (PCs) 14 and 15. The PCs are used at the output of the lasers to assist in the efficient interference of the two lasers. A high power optical amplifier 17 then amplifies the combined signal at the output of the combiner 16. This amplification enhances the non-linear effects of the subsequent optical medium, (the multiplier 18), since non-linearity of the optical medium (such as an optical fiber) is proportional to the power of the signal.

The interference of the two laser outputs forms a "beat" signal. Consider two monochromatic lasers, the first 10 with central frequency $f_1$ and optical intensity $I_1$, and the second 11 with central frequency $f_2$ and optical intensity $I_2$, their complex wave-function at some point in space is $$U_1(t) = I_1^{1/2} \exp(j2\pi f_1 t),$$

and $$U_2(t) = I_2^{1/2} \exp(j2\pi f_2 t),$$

respectively.

The interference wave-function then is the sum of the two, which is $$U(t) = U_1(t) + U_2(t) = I_1^{1/2} \exp(j2\pi f_1 t) + I_2^{1/2} \exp(j2\pi f_2 t).$$

Therefore, the intensity of the combined signal, I(t), would be $$I(t) = I_1 + I_2 + 2(I_1 I_2)^{1/2} \cos[\pi(f_2 - f_1)t].$$

This shows that the intensity varies sinusoidally at the difference frequency $|f_2 - f_1|$, which is called the "beat frequency." This signal is a good candidate for use alongside fiber non-linearity effects to provide a wide coverage through channel multiplication of the initial laser sources. This is mainly due to of the fact that this method provides very short optical pulses.

The novel design further relies on the multiplier stage 18, which expands the coverage of the wavelength channels by "multiplying" the original two channels using non-linear effects in optical fibers. The multiplier 18 preferably consists of a series interconnection of optical fibers with different chromatic dispersion characteristics, which is called a Comblike Dispersion Profile Fiber (CDPF) system. The multiplier design is first done through analytical calculations as well as simulations. An efficient multiplier is one that can provide a wide coverage with enough laser signal-to-noise ratio or equivalently good extinction ratio. If the system is properly designed, longitudinal modes can be preserved in the wide band signal, thus enabling continuous wave channels to be realized. In fact, the multiplier creates very short optical pulses from the beat signal and at the same time expands the wavelength coverage. Going through optical fiber non-linear effects such as Cross Phase Modulation (XPM), Self Phase Modulation (SPM) and Four Wave Mixing (FWM), high power short optical pulses can generate a wide band coherent signal, which is also called a "Super Continuum" (SC).

The generalized nonlinear Schrodinger equation is used to describe the propagation of the optical pulse in an optical fiber:

$$\frac{\partial E(z,t)}{\partial z} = [\hat{D} + \hat{N}] \cdot E(z,t).$$

Where E(z,t) denotes the electrical field of the light wave. The non-linearity is shown by the $\hat{N}$ operator, which depends on the nonlinear index and represents photon elastic and inelastic scattering processes, such as Rayleigh and Raman scattering in the fiber. $\hat{D}$ is the dispersion operator which relates to the dispersion parameter of the fiber. This equation includes nonlinear processes such as SPM, XPM, FWM, Raman effects, the first and second order of group-velocity dispersion (GVD) and fiber attenuation.

In the present exemplary embodiment an MWLS for 100 GHz spaced system in the C-Band, i.e. 40 Channels, is considered. In this system, the two DFB lasers 10 and 11 are tuned to wavelength channels on the ITU grid around 1550 nm. As shown to FIG. 1, the outputs of the lasers are directed through the polarization controllers 14 and 15 to enhance laser beat quality when they interfere. The 3-dB coupler 16 is then used to combine the output of these two single channel lasers. The combined output signal is then amplified to about 800 mW range by the high power Erbium Doped Fiber Amplifier (EDFA) 17. This high power signal goes through the CDPF system 18 to be expanded. To design the CDPF stage 18, we need to solve the Shrödinger equations of the optical fiber system to insure proper expansion as well as preservation of the longitudinal modes.

Figure 2:
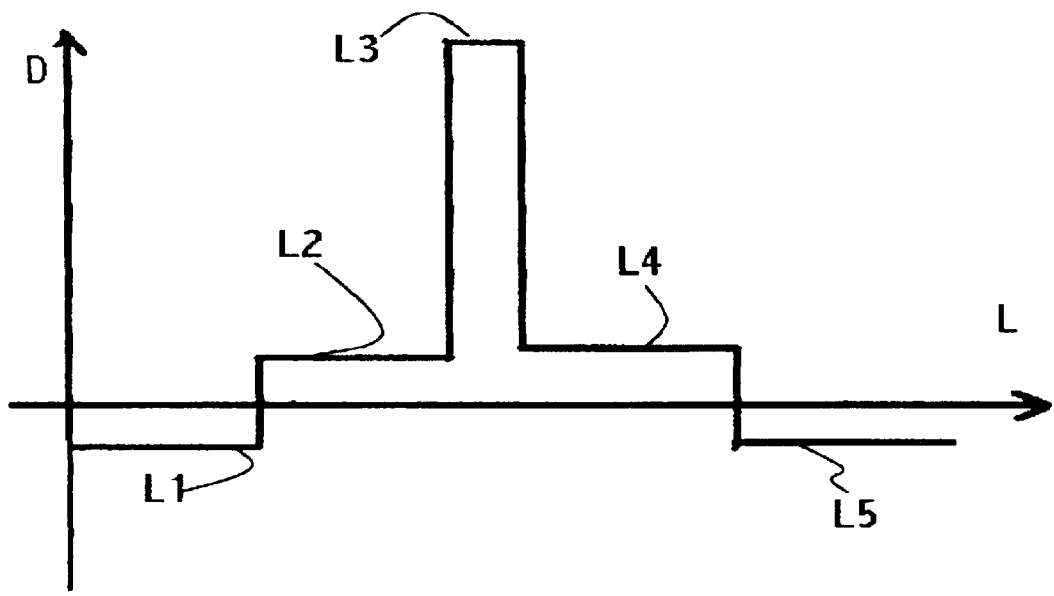
FIG. 2 illustrates dispersion versus length of a Comblike Dispersion Profile Fiber System used as the Multiplier in FIG. 1 for the C-Band MWLS with 100 GHz spacing.

FIG. 2 shows the CDPF system 18 designed for this example, which consists of five stages of Dispersion Shifted Fiber (DSF) and Single Mode Fiber (SMF) with different chromatic dispersion characteristics. As shown for this example, $L_1 = 1.1$ km, $L_2 = 1.1$ km, $L_3 = 20$ m, $L_4 = 1$ km, and $L_5 = 1$ km, where the associated dispersion values are D1=−0.399 ps/km/nm, D2=0.402 ps/km/nm, D3=16 ps/km/nm, D4=0.402 ps/km/nm, and D5=−0.399 ps/km/nm; all at 1550 nm. In this CDPF system 18 the first, second, fourth and fifth segments are DSF and the third segment is SMF.

The high power beat signal at the output of the amplifier 17 and the CDPF 18 shown in FIG. 2 are necessary to realize the MWLS but not always sufficient. In order to expand the channel coverage, we need to suppress the Stimulated Brillouin Scattering (SBS) in the system. SBS reflects and scatters some of the injected power. This reduces the effective power launched to trigger non-linear effects. SBS frequency depends on the germanium concentration in the optical fibers. In the CDPF structure 18, since the concentration of germanium is different in each segment, it can suppress the SBS growth through the system. However, since the SBS threshold is lower for narrow band signals, it is important to reduce the SBS in the system. An improvement in the present exemplary embodiment is achieved by modulating the DFB lasers 10 and 11 by a very low frequency signal (around 30 kHz), which does not affect system operation. Experimental results, as well as simulations, show significant reduction in SBS.

Figure 3:
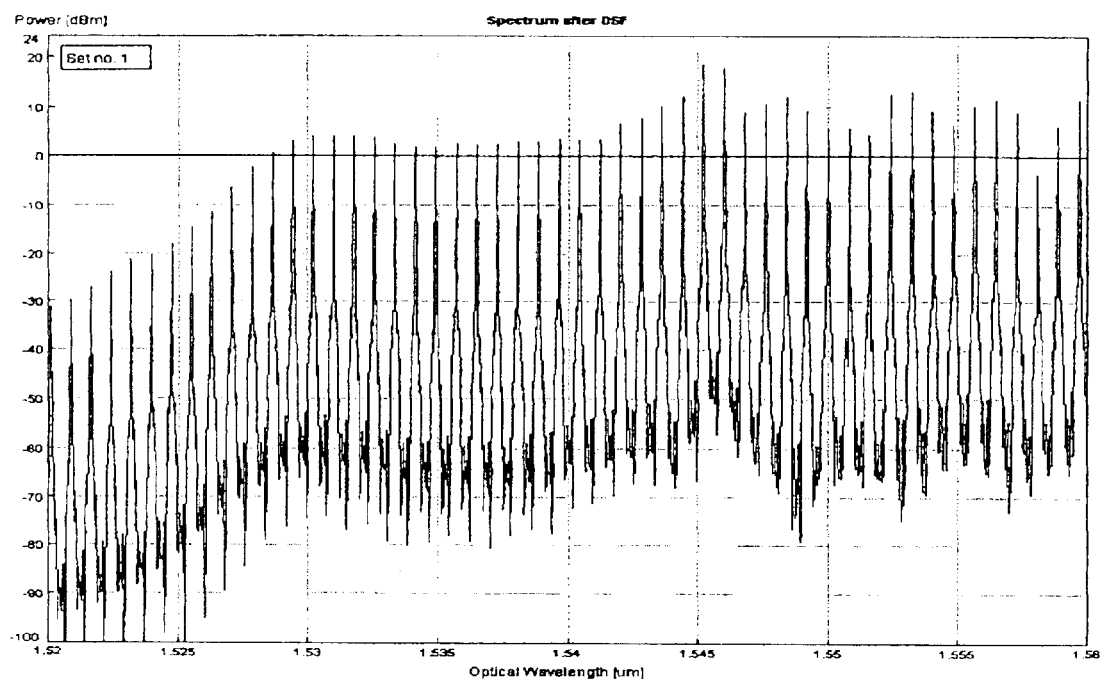
FIG. 3 shows the simulation result for the C-Band MWLS with 100 GHz spacing.
Figure 4:
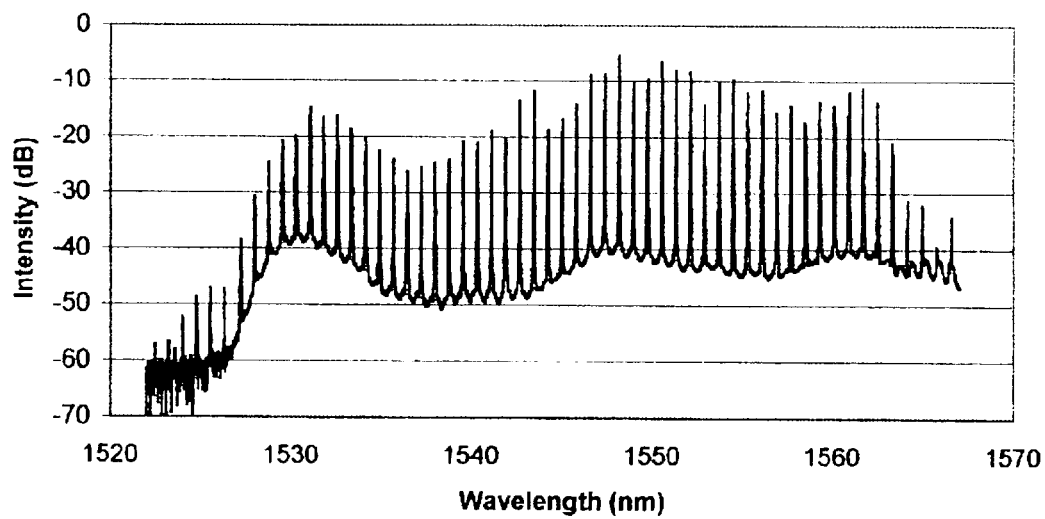
FIG. 4 shows the actual experimental result for the C-Band MWLS with 100 GHz spacing.

Finally, the simulation result is shown in FIG. 3, while the MWLS output from the experimental results in the laboratory is shown in FIG. 4. As shown, for this instance of the MWLS the C-Band is covered with Continuous Wave (CW) channels spaced at 100 GHz. In this example, each output channel power is around 12 mW.

What is claimed is:

1. A multi-wavelength laser source (MWLS) system, comprising:
   (a) first and second monochromatic lasers having first ($f_1$) and second ($f_2$) lasing frequencies respectively and producing signals having first and second optical intensities respectively;
   (b) means for amplifying combined signals of said first and second lasers;
   (c) means for multiplying using non-linear optical effects the amplified combined signals to expand the coverage of the wavelength channels so as to yield comb-like multi-channel WDM laser signals comprising a plurality of more than two channels separated from each other by a frequency equal to the difference between $f_1$ and $f_2$.

2. The system as defined in claim 1, said means for multiplying comprising a plurality of serially interconnected optical fiber sections each section having respective predetermined propagation characteristics for said amplified combined signals which differ from respective predetermined propagation characteristics of any neighbouring sections.

3. The system as defined in claim 2, said predetermined propagation characteristics being propagation mode, dispersion and length.

4. The system as defined in claim 2, said plurality of serially interconnected fiber sections being five having lengths $L_1$, $L_2$, $L_3$, $L_4$ and $L_5$, respectively, $L_1$ being the first section, and $L_5$ being the last section.

5. The system as defined in claim 4, the third fiber section comprising a single mode fiber (SMF) section.

6. The system as defined in claim 5, the first, second, fourth, and fifth fiber sections comprising dispersion shifted fiber (DSF) sections.

7. The system as described in claim 6, in which $L_1$=1.1 kin, $L_2$=1.1 km, $L_3$=20 m, $L_4$=1 km and $L_5$=1 km.

8. The system as defined in claim 7, said five fiber sections having associated dispersion values, $D_1$ to $D_5$ as follows: $D_1$=−0.399; $D_2$=0.402; $D_3$=16; $D_4$=0.402 and $D_5$=−0.399, all in units of ps/km/nm.

9. The system as described in claim 8, wherein $f_1$ and $f_2$ correspond to wavelengths in the vicinity of 1550 nm.

10. A system as defined in claim 2 comprising means for modulating said first and second monochromatic lasers when the first and second monochromatic lasers are lasing by a very low frequency signal whereby Stimulated Brillouin Scattering of the amplified combined signals is reduced.

11. A multi-wavelength laser source (MWLS) system, comprising:
   (a) first and second monochromatic lasers having first and second lasing frequencies respectively, and producing outputs having first and second optical intensities respectively;
   (b) a coupler and amplifier adapted to combine and amplify the outputs of the first and second monochromatic lasers to produce a amplified combined signal having a beat frequency equal to a difference between the first and second lasing frequencies;
   (c) a plurality of serially interconnected optical fiber sections, each section having respective predetermined propagation characteristics, the propagation characteristics of the plurality of serially interconnected optical fiber sections being collectively selected to expand the coverage of the wavelength channels so as to yield comb-like multi-channel WDM laser signals comprising a plurality of more than two channels separated from each other by a frequency equal to the beat frequency.

* * * * *